May 29, 1951 A. BENZ 2,554,553
SPRING TRUNNION MOUNT
Filed Oct. 21, 1947 2 Sheets-Sheet 1
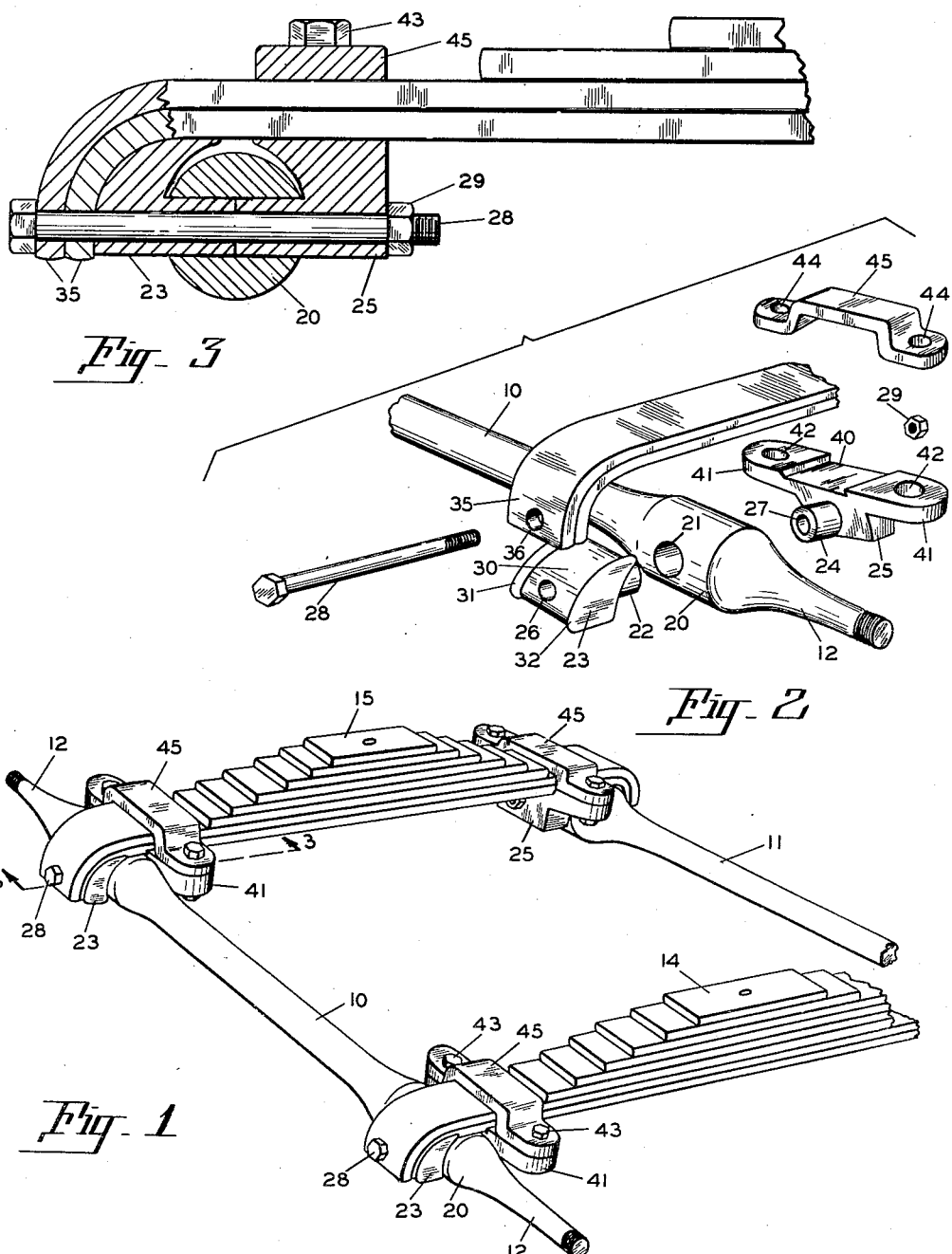
INVENTOR.
AUGUST BENZ
BY
ATTORNEY May 29, 1951 A. BENZ 2,554,553
SPRING TRUNNION MOUNT
Filed Oct. 21, 1947 2 Sheets-Sheet 2
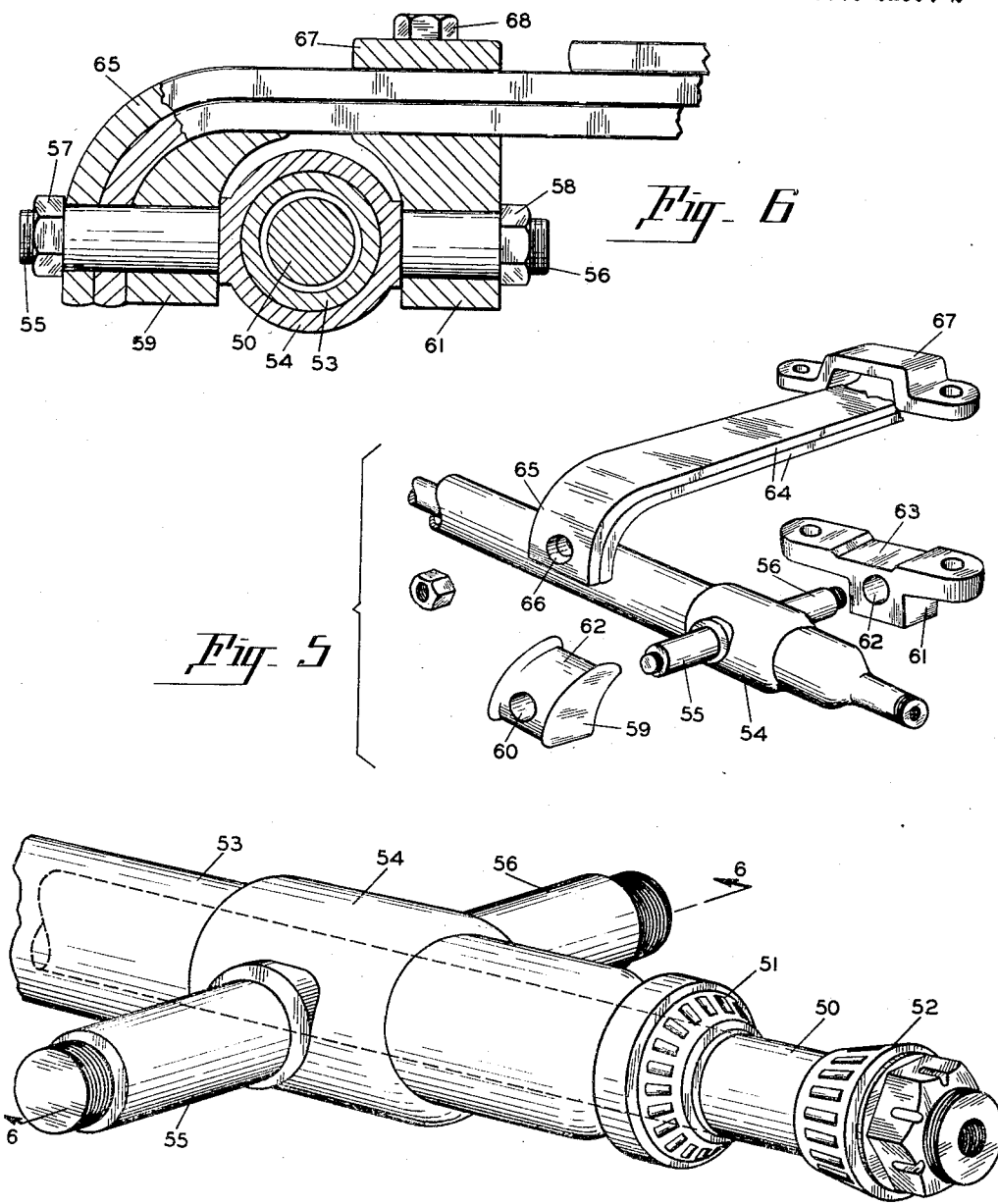
INVENTOR.
AUGUST BENZ
BY
ATTORNEY Patented May 29, 1951

2,554,553

UNITED STATES PATENT OFFICE 2,554,553

SPRING TRUNNION MOUNT

August Benz, Portland, Oreg.

Application October 21, 1947, Serial No. 781,057

9 Claims. (Cl. 267—54)

1

My present invention relates to a spring mount for a vehicle, with particular reference to heavy duty vehicles such as trucks, logging trailers, tank trucks and the like which are subjected to severe shocks in usage.

The principal object of the present invention is to attach a leaf spring to an axle in such fashion that the twisting forces created when traveling over uneven roads or in applying the brakes suddenly are transmitted to the vehicle frame from the wheels through the springs without damaging any portion of the assembly. This object is achieved, in part, by attaching the springs to the axles by means of trunnions centered in the axle.

The usual practice in fastening a leaf spring to an axle is to clamp the ends of the spring in shackles which are fastened about the axle as by means of U-bolts or the equivalent. With such prior art constructions, the sudden application of braking forces to the wheels of a heavily loaded vehicle tended to shear the U-bolts, or otherwise damage the assembly, due to the long moment arm between the center of the axle and the spring created by the shackle. The present invention eliminates this danger by attaching the spring to trunnions whose axes intersect the longitudinal axes of the axles, and by hooking the ends of the leaf spring around trunnion blocks positioned on the trunnions. In the present invention, a force which tends to twist the axle clockwise is balanced and overcome by a relatively stronger force tending to twist the axle counterclockwise, with the net result that braking merely tends to shove the axle forward in linear movement only rather than linear movement coupled with rotation of the axle.

A further object of the present invention is to provide a truck or the like with sturdy spring suspension means which are assembled of relatively simple, easily fabricated, inexpensive and rugged parts which are easily removable and replaceable in the event of damage to any portion of the assembly requiring repairs. Thus an object of the present invention is to provide means for increasing the safety of loaded vehicles in such manner as not to increase the cost of fabrication or maintenance of the vehicle.

The foregoing and other objects and advantages of the present invention will be more readily apparent from inspection of the accompanying drawings taken in connection with the following specification, wherein like numerals refer to like parts throughout and in which preferred embodiments of the invention are illustrated, while

2 the features of novelty will be more particularly pointed out in the appended claims.

In the drawings, Fig. 1 is a partial view in perspective of a spring and axle assembly illustrating the present invention;

Fig. 2 is an exploded view in perspective illustrating the parts of one of the spring trunnion mounting means;

Fig. 3 is a partial vertical section taken substantially along line 3—3 of Fig. 1;

Fig. 4 is a view in perspective of a modified form of trunnion mount embodying the present invention;

Fig. 5 is a partial, exploded view in perspective of the parts of a trunnion mount and spring assembly incorporating the modification illustrated in Fig 4; and Fig. 6 is a partial, vertical section taken substantially along line 6—6 of Fig. 4.

In Figs. 1 to 3, inclusive, there is illustrated a dual axle assembly such as is used in heavy duty trailers of the type adapted to convey logs, or to support tanks for liquids or van housings and the like. The assembly comprises a pair of axles 10 and 11, each of which terminates in a pair of spindles 12 for mounting wheels (not shown). The axles form a substantially quadrilateral frame with a pair of leaf springs 14 and 15 adapted to be attached to the body of the trailer in any of the well known manners, the points of attachment being at or near the longitudinal centers of the leaf springs. The leaves of each of the springs are of different lengths, with the shortest at the top of each assembly and, preferably, the lowermost pair being of substantially equal length and the longest so as to provide projecting ends of suitable thickness to be clamped to the axles.

In accordance with the present invention, each axle is provided with a pair of enlargements 20 adjacent the spindle portions through which extend openings 21 adapted to receive trunnions 22 extending from outer mounting blocks 23 and trunnions 24 extending from inner mounting blocks 25. The blocks 23 and 25 are provided with openings 26 and 27, respectively, which are coaxial with the trunnions 22 and 24, for the reception of a bolt 28 which is adapted to be retained by a nut 29, thus providing means to hold the trunnion blocks in position as illustrated in Figs. 1 and 3. It will be seen in Fig. 3 that the trunnions 22 and 24 are preferably so long as to meet in the middle of the axle 20 before the inner surfaces of the trunnion blocks are drawn up tightly against the outer surface of the axle, thus permitting the trunnion blocks to pivot slightly as the axle assumes an angular relation to its normal position due to uneven road surfaces. For this purpose the inner surfaces of the trunnion blocks are preferably shaped to a larger radius of curvature than that of the axle.

The upper surface of the trunnion block 23 is formed to provide an upwardly curved surface 30 bounded by flanges 31 and 32 defining a seat to snugly support the hooked ends 35 of the lowermost pair of leaves, the ends 35 being provided with openings 36 for the reception of bolt 28.

The inner trunnion block 25 is provided with a horizontal, central groove 40 adapted to embrace the edges of the lowermost leaves, and a pair of laterally extending wings 41 having vertical openings 42 therethrough adapted to receive bolts 43 passing through matching openings 44 in a clamp 45 adapted to embrace the lowermost pair of leaves.

The present construction, therefore, provides means tending firmly to maintain the rectangular relationship of the springs and axles. If a force is created tending to hold the wheels stationary while the inertia of the load carries the trailer body forward, one resultant will be the depression of the central portions of the springs. The tendency of the springs to twist free from the axles is chiefly transmitted through the curved ends of the trunnion blocks 23, and this force is resisted by the moment arm effect of the trunnion blocks 25 and clamps 45. Therefore momentary twisting of the axle by the spring is resisted and limited to a very small amount.

In the modification disclosed in Figs. 4 and 5, the present invention is adapted to the attachment of a driving axle to a vehicle body through the medium of a leaf spring, thus adapting the present invention to use with driving axles of trucks and other automotive vehicles. In the present invention, the axle 50, which is provided with wheel mounting means such as the bearings 51 and 52, extends through an axle housing tube 53. The tube 53 has a collar 54 slipped thereon and fastened thereto as by welding. From the collar 54 extend a pair of horizontal, oppositely directed trunnions 55 and 56 whose extremities are reduced and threaded for the reception of nuts 57 and 58 respectively. An outer trunnion block 59 is provided with an opening 60 for the reception of trunnion 55 and an inner trunnion block 61 is provided with an opening 62 for the reception of trunnion 56. The blocks 59 and 61 are provided with grooves 62 and 63, respectively, for the reception of the lowermost pair of leaves 64 which are provided with curved ends 65 having openings 66 therethrough adapted to receive the trunnion 55. A clamp 67 is bolted to the block 61 by bolts 68 and is so shaped as to embrace the pair of leaves 64 as in the previous modification. In order to permit twisting of the axles with respect to the springs, the trunnions 55 and 56 are provided with shoulders against which the nuts 57 and 58 are drawn up, and the axle housing collar 54 is provided with bosses from which the trunnions project and which provide bearing surfaces on which the trunnion blocks may turn. It will be readily apparent from inspection of this modification that the net result is the same as in the previously described construction.

An advantage of the present invention which is not readily apparent is that, when the trunnion blocks are clamped rigidly to the axles, the spring is supported in proper relationship and relatively immovable with respect to the axle; but, when it is desired to disassemble an axle and spring assembly, loosening of the trunnions will permit relative movement between the axle and the end of the spring. As is well known to those skilled in the art, such relative movement is often of great assistance in facilitating assembly or disassembly of the several parts.

Having illustrated and described preferred embodiments which the invention may assume, it should be readily apparent to those skilled in the art that the invention permits of modification in arrangement and detail. All such modifications as come within the true spirit and scope of the appended claims are considered to be a part of my invention.

I claim:

1. A spring and axle assembly comprising a rotatable axle, a tubular housing surrounding said axle, a pair of horizontally disposed, oppositely directed trunnions fastened to said tubular housing and extending in opposite directions substantially normal to the longitudinal axis of said axle, a pair of trunnion blocks pivotally mounted upon said trunnions, one of said trunnion blocks having an upwardly curved surface, a leaf spring comprising at least one leaf resting upon said trunnion blocks and having its free end downwardly curved to fit the curved surface of said one trunnion block, said free end having an opening therethrough to embrace the respective trunnion, and a clamp attached to the other of said trunnion blocks and embracing an intermediate portion of said spring.

2. A spring and axle assembly comprising a rotatable axle, a tubular housing surrounding said axle, a pair of horizontally disposed, oppositely directed trunnions fastened to said tubular housing and extending in opposite directions substantially normal to the longitudinal axis of said axle, a pair of trunnion blocks pivotally mounted upon said trunnions, a leaf spring comprising at least one leaf resting upon said trunnion blocks and having its free end downwardly hooked over one of said trunnion blocks, and a clamp attached to the other of said trunnion blocks and embracing an intermediate portion of said spring.

3. A spring and axle assembly comprising a rotatable axle, a tubular housing surrounding said axle, a pair of horizontally disposed, oppositely directed trunnions fastened to said tubular housing and extending in opposite directions substantially normal to the longitudinal axis of said axle, a pair of trunnion blocks pivotally mounted upon said trunnions, one of said trunnion blocks having an upwardly curved surface, a leaf spring comprising a pair of leaves resting upon said trunnion blocks and having their free ends downwardly curved to fit the curved surface of said one trunnion block, said free ends having openings therethrough to embrace the respective trunnion, and a clamp attached to the inner of said trunnion blocks and embracing an intermediate portion of said spring.

4. A spring and axle assembly comprising a rotatable axle, a tubular housing surrounding said axle, a pair of horizontally disposed, oppositely directed trunnions fastened to said tubular housing and extending in opposite directions substantially normal to the longitudinal axis of said axle, a pair of trunnion blocks pivotally mounted upon said trunnions, one of said trunnion blocks having an upwardly curved surface, a leaf spring comprising a pair of leaves resting upon said trunnion blocks and having their free ends downwardly curved to fit the curved surface of said one trunnion block, said free ends having openings therethrough to embrace the respective trunnion, and means to fasten an intermediate portion of said pair of leaves to the other of said trunnion blocks.

5. A vehicle comprising an axle, a leaf spring extending at right angles to said axle and having an end portion overlying said axle, a pair of trunnion blocks arranged on opposite sides of said axle, each of said trunnion blocks having a portion overlying said axle and extending toward the other of said trunnion blocks, said end portion of said spring assembly resting upon the upper surfaces of said trunnion blocks, means supporting said trunnion blocks for rotation about a horizontal axis normal to the axis of said axle, means engageable with the portions of said trunnion blocks overlying said axle to limit rotation thereof about said horizontal axis, means to retain the overlying portion of said spring in engagement with the upper surface of one of said trunnion blocks, and means to retain the extreme end portion of said spring in engagement with the outer surface of the other of said trunnion blocks, said extreme end portion of said spring being downwardly curved so as to extend partially around said axle beyond said horizontal axis and said other trunnion block being curved in a complementary manner to fit the under surface of the curved portion of said leaf spring, and said means to retain the extreme end portion of said leaf spring in engagement with said other trunnion block lying along said horizontal axis.

6. A spring and axle assembly comprising an axle, a leaf spring comprising a lower pair of adjacent leaves of substantially equal length extending beyond the remainder of said spring, said lower pair having a horizontally disposed portion overlying said axle and having their ends downwardly curved about said axle and terminating beneath a horizontal plane passing through the axis of said axle, a pair of trunnion blocks mounted at opposite sides of said axle and engaging the lower surface of the lowermost of said leaves, means supporting said trunnion blocks for limited rotation about a horizontal axis normal to the axis of said axle, means to retain the overlying portions of said two lowermost leaves firmly against the upper surface of one of said trunnion blocks, and means lying along said horizontal axis and passing through the tips of said lowermost pair of leaves to retain said tips firmly against the upper surface of the other of said trunnion blocks.

7. The construction set forth in claim 5 in which said axle is provided with a substantially horizontal, cylindrical opening therethrough, and said trunnion block supporting means comprise a pair of trunnions each extending inwardly from one of said trunnion blocks into an end of said opening.

8. The construction set forth in claim 5 in which said axle is provided with a substantially horizontal, cylindrical opening therethrough, and said trunnion block supporting means comprise a pair of trunnions each extending inwardly from one of said trunnion blocks into an end of said opening, and said means to retain the extreme end portion of said spring comprises a bolt passing through the end of said spring and through said trunnions.

9. The construction set forth in claim 5 in which said axle is provided with a substantially horizontal, cylindrical opening therethrough, and said trunnion block supporting means comprise a pair of trunnions each extending inwardly from one of said trunnion blocks into an end of said opening, said means to retain the extreme end portion of said spring comprises a bolt passing through the end of said spring and through said trunnions, and said trunnions meet in said opening and prevent said trunnion blocks from being clamped against said axle by said bolt.

AUGUST BENZ.

REFERENCES CITED

The following references are of record in the file of this patent:

UNITED STATES PATENTS

| Number | Name | Date |
|---|---|---|
| 1,583,104 | Adriaenssens | May 4, 1926 |
| 1,871,432 | Fageol | Aug. 9, 1932 |
| 1,968,109 | Walker | July 31, 1934 |
| 2,343,872 | Low | Mar. 14, 1944 |

FOREIGN PATENTS

| Number | Country | Date |
|---|---|---|
| 95,927 | Switzerland | Sept. 1, 1922 |
| 421,651 | Germany | Nov. 16, 1924 |
| 593,840 | Germany | Mar. 8, 1934 |